United States Patent Office 3,042,477
Patented July 3, 1962

3,042,477
NEW COLOURATION PROCESS
Harry Rose Hadfield, Ronald Herbert Ricketts, Joseph Simons, and William Elliot Stephen, all of Manchester, England, assignors to Imperial Chemical Industries Limited, London, England, a corporation of Great Britain
No Drawing. Filed June 10, 1957, Ser. No. 664,511
Claims priority, application Great Britain June 15, 1956
6 Claims. (Cl. 8—55)

This invention relates to a new colouring process and more particularly it relates to a new process for the colouration of artificial fibres.

It is well known that artificial fibres, for example fibres made from cellulose esters, and linear polyamides may be coloured by application thereto of aqueous suspensions of water-insoluble dyestuffs.

It has now been found that aqueous suspensions of water-insoluble dyestuffs containing a mono- or di-halogeno-1:3:5-triazin-2-ylamino group, may be used to print or dye the said fibres and also natural silk to give colourations having improved wet fastness as compared with colourations obtained with dispersed water-insoluble dyestuffs previously used for dyeing or printing artificial fibres.

According to the invention therefore there is provided a process for the colouration of artificial fibres and natural silk which comprises applying thereto an aqueous suspension of a water-insoluble colouring matter containing a mono- or dihalogeno-1:3:5-triazin-2-ylamino group.

By water-insoluble colouring matter is meant a dyestuff free from ionogenic solubilising groups or a dyestuff intermediate which can be converted in situ on the fibre into a dyestuff free from ionogenic solubilising groups, for example an azoic coupling component or an aromatic primary amine which is free from ionogenic solubilising groups.

The artificial fibres which may be coloured by the process of the invention include fibres made, for example, from cellulose esters such as cellulose acetate and cellulose triacetate, from polyamides such as polyhexamethylene adipamide and the polymer from caprolactam, from polyurethanes, from modified polyacrylonitrile fibres or from polyvinyl alcohol fibres.

The water-insoluble colouring matters used in the process of the invention may for example be obtained from dyestuffs or dyestuff intermediates free from ionogenic solubilising groups which contain an amino group containing at least one replaceable hydrogen atom attached to the nitrogen atom by interacting the dyestuff or dyestuff intermediate with a cyanuric halide, for example cyanuric chloride or cyanuric bromide or with a 2:4-dihalogeno-1:3:5-triazine, for example 2:4-dichloro-6-methoxy-1:3:5-triazine, 2:4-dichloro-6-phenoxy-1:3:5-triazine, 2:4-dichloro-6-ethoxy-1:3:5-triazine, 2:4-dichloro-6-dimethylamino-1:3:5-triazine, 2:4-dichloro-6-phenylamino-1:3:5-triazine, 2:4-dichloro-6-β-hydroxyethylamino-1:3:5-triazine, 2:4-dichloro-6-β-cyanoethylamino-1:3:5-triazine, 2:4-dichloro-6-phenyl-1:3:5-triazine and 2:4-dichloro-6-methyl-1:3:5-triazine.

The dyestuff or dyestuff intermediate used as starting material may be for example a nitro-dyestuff, an azo dyestuff, an anthraquinone dyestuff, or it may be an azoic intermediate, for example it may be an aromatic diamine, an aminophenol, or an aminonaphthol.

As examples of nitro dyestuffs which may be used as starting material there may be mentioned 2:4-dinitro-3'- and 4'-aminodiphenylamines, and other 4-substituted 2-nitro-4'-aminodiphenylamines, containing as substituents an acyl group for example acetyl, a sulphonamide group, for example sulphon-β-hydroxyethylamide or sulphondimethylamide, a trifluoromethyl group, or an amide group, for example carbonanilido or carboncyclohexylamido.

As examples of azo dyestuffs which may be used as starting materials there may be mentioned aminohydroxyazobenzene derivatives such as 4-amino-2'-hydroxy-5'-methylazobenzene,
4-amino-2'-hydroxy-5'-phenylazobenzene,
4-amino-2':4'-dihydroxyazobenzene,
4-amino-2-methoxy-2'-hydroxy-5'-tertamylazobenzene, benzene-azo pyrazolones such as
4-(4'-aminophenylazo)-3-methyl-5-pyrazolone,
4-(2'-carbomethoxyphenylazo)-1-(3'' - aminophenyl) - 3-methyl-5-pyrazolone,
4-(3'-aminophenylazo)-3-carbethoxy-5-pyrazolone,
4-(4'-aminophenylazo)-1-(2''-chlorphenyl)-3 - methyl - 5-pyrazolone, disazo compounds such as 4-(4'-(4''-aminophenylazo)-3'-methylphenylazo)phenol and diaminoazo compounds such as
4'-amino-4-dimethylaminoazobenzene,
4:4'-diaminoazobenzene,
4:4'-diamino-2-methyl-5-methoxyazobenzene,
4-(4'-aminophenylazo)-1-naphthylamine,
4'-amino-4-di-(β - hydroxyethyl)amino-2 - methylazobenzene,
2'-chloro-4'-nitro-4-(N-β-hydroxyethyl-N-β - aminoethyl)-aminoazobenzene,
2'-chloro-4'-ethanesulphonyl-4-(N-β-hydroxyethyl - N - β-aminoethyl)aminoazobenzene and
4'-cyano-2'-trifluoro-methyl-4-(N-β - hydroxyethyl - N - β-(β-hydroxyethylamino)ethyl)aminoazobenzene.

As examples of anthraquinone dyestuffs which may be used as starting materials there may be mentioned 1-p-amino-anilinoanthraquinone and 4-hydroxy-1-β-aminoethylaminoanthraquinone.

Where the water-insoluble colouring matter applied to the fibres is not the desired final dyestuff but is a coloured or colourless substance which is to be converted to the desired final dyestuff, it is to be understood that the process of the present invention includes any prior, simultaneous or after treatments as may be necessary to convert the water-insoluble colouring matter to the desired final dyestuff in situ on the fibre.

For example, where the water-insoluble compound contains a primary aromatic amino group, the treatment of artificial fibres therewith may be carried out in conjunction with a treatment with an azoic coupling component for example p-cresol, β-naphthol, 1-phenyl-3-methyl-5-pyrazolone, 2-hydroxy-3-naphthanilide, 2-hydroxy-3-naphtho-o-toluidide, 3-N:N-diethylaminoacetanilide, N:N-di-β-hydroxyethyl-m-toluidine and N-(β-hydroxyethyl)-N-(β-cyanoethyl)-m-toluidine, and the treated fibre may then be treated with aqueous nitrous acid at a temperature preferably lying between 0° C. and 110° C. Also where the water-insoluble colouring matter contains a group (for example an aromatic hydroxyl, aromatic tertiary amine, or a —CH$_2$.CO— group which may, for example, form part of a pyrazolone ring or an acetoacetamido group) which renders the colouring matter capable of coupling with a diazo component, the treatment of the artificial fibre with the said water-insoluble colouring matter may be carried out in conjunction with a treatment with an aromatic primary amine free from ionogenic solubilising groups for example paranitroaniline, 2-chloro-4-nitroaniline, 2-chloro-4-ethanesulphonylaniline, 4-cyano-2-trifluoromethylaniline, 6-chloro-2:4-dinitroaniline and 3-chloro-4-aminoazobenzene and heterocyclic compounds such as 6-methoxy-2-aminobenzthiazole, 6-ethanesulphonyl-2-aminobenzthiazole and 5-nitro-2- aminothiazole and the fibre may then be treated with nitrous acid as described above.

The aqueous suspension of the water-insoluble colouring matter may be applied to the fibre by dyeing or printing methods. The water-insoluble colouring matters may be dispersed in water by the aid of dispersing agents for example sulphonated naphthalene-formaldehyde condensation products, sulphosuccinic acid esters, Turkey Red oil, alkylphenolethylene oxide condensation products, soap, and similar surface active materials with or without protective colloids such as dextrin, British gum and water-soluble proteins, to maintain the colouring matter in dispersion. The water-insoluble colouring matters can if desired, be converted to a dispersible powder form.

The water-insoluble colouring matter may be applied from aqueous dyebaths containing, if desired, substances known to improve or assist dyeing, for example, the dispersing agents and protective colloids described above and electrolytes, for example sodium chloride and sodium sulphate.

The dyeing of the artificial fibres may be carried out at temperatures at or near the boiling point of the dyebath preferably at a temperature between 75° C. and 100° C. or if desired, a higher temperature may be used for example there may be used a temperature between 100° C. and 130° C. the dyeing being carried out at super-atmospheric pressure.

Cellulose esters which are not stable at temperatures above 90° C. for example cellulose acetate may be dyed at lower temperatures preferably at a temperature between 60° C. and 85° C.

It is sometimes found that the fastness to washing or subsequent wet processing of the colouration obtained on fibre made from polyamides or cellulose esters is improved by aftertreatment with a hot aqueous solution of an alkali, for example sodium carbonate, ammonia, or ethanolamine.

The fibre may then, if desired be scoured with a hot solution of soap or synthetic detergent, then rinsed in hot water and dried. If desired the alkali treatment and soaping may be carried out in one operation by using an alkaline solution of soap or synthetic detergent.

In the dyeing of cellulose triacetate with the water-insoluble colouring matters by the process of this invention it is sometimes advantageous to use a swelling agent or other dyeing "carrier" material for example diphenyl, dichlorobenzene, trichloroethylene or o- or p-phenylphenol. When a temperature between 120° C. and 130° C. is used, however, dyeing can usually be carried out successfully in the absence of a "carrier" or swelling agent.

After the application of the water-insoluble colouring matter and before scouring, the cellulose triacetate is preferably treated with a strongly reducing solution optionally in the presence of a dispersing agent for example an aqueous alkaline solution of sodium hydrosulphite, whereby the fastness of the dyeing to subsequent rubbing and/or wet treatments is increased.

The water-insoluble colouring matters may also be applied to artificial fibres by printing the fibres with a thickened print paste containing the colouring matters in the form of a fine dispersion.

The printing paste may contain alkaline substances or other substances such as sodium bicarbonate, which on heating are converted to alkaline substances, and it may be thickened with any of the usual thickening agents for example with methyl-cellulose, starch, locust bean gum and Nafka crystal gum but when an alkaline substance or a substance which on heating is converted to an alkaline substance is incorporated in the printing paste it is preferred to use sodium alginate as thickening agent.

There may also be added to the printing paste normal adjuvants for example urea, thiourea or thiodiglycol and in particular adjuvants used for the application of disperse dyes such as methylated spirits, sodium metanitrobenzene sulphonate and aqueous emulsions of sulphonated oils.

When printing cellulose triacetate the water-insoluble compounds may be applied in conjunction with a swelling agent or other dyeing "carrier" material for example diphenyl, or o- or p-phenylphenol.

The process of the invention may conveniently be carried out by applying the printing paste to the artificial fibres by printing with block, spray, stencil, screen or roller, preferably drying the printed fabric, then steaming to fix the water-insoluble colouring matter, for example by steaming in a Mather and Platt steam ager for 30 minutes or, preferably in the case of cellulose triacetate fibres, by steaming in a closed vessel at superatmospheric pressure, preferably at a temperature between 110° C. and 120° C.

By the process of the invention there may be obtained on natural silk and artificial fibres, especially polyamide fibres, a wide range of colourations which are distinguished by their high fastness to wet treatments and to dry heat treatments.

The water-insoluble colouring matters containing 4:6-dichloro-1:3:5-triazin-2-ylamino, 4-chloro-6-β-hydroxyethylamino-1:3:5-triazin-2-ylamino, 4-chloro-6-di(β-hydroxyethyl)amino-1:3:5-triazin-2-ylamino and 4-chloro-6-phenoxy-1:3:5-triazin-2-ylamino groups, and particularly those which also contain azo groups, are especially valuable for use in the process of the invention as they build up well on the fibre to give strong intense colourations especially on polyamides.

The invention is illustrated but not limited by the following examples in which parts and percentages are by weight:

EXAMPLE 1

1 part of the dyestuff obtained by reacting 4-amino-4'-dimethylaminoazobenzene with 1 molecular proportion of cyanuric chloride is dispersed in 20 parts of water and the dispersion is added to 4,000 parts of water containing 4 parts of the condensate of ethylene oxide with a fatty alcohol. 100 parts of nylon fabric are added and the dyebath thus obtained is heated to 95° C. and maintained at this temperature for 60 minutes. The fabric is then treated with a hot aqueous solution containing 0.1% of soap and 0.1% of sodium carbonate and it is then rinsed and dried. The nylon is thus dyed to a yellow shade of very good fastness to washing.

EXAMPLE 2

The dyestuff used in Example 1 is replaced by an equal weight of the dyestuff obtained by reacting 4-amino-2'-hydroxy-5'-methylazobenzene with one molecular proportion of 2-methoxy-4:6-dichloro-1:3:5-triazine. The nylon fabric is dyed to give a yellow shade of very good fastness to washing.

EXAMPLE 3

The dyestuff used in Example 1 is replaced by an equal weight of the dyestuff obtained by coupling diazotised 3-chloro-4-aminophenyl ethyl sulphone with the product obtained by interaction of equimolecular amounts of 2-methoxy-4:6-dichloro-1:3:5-triazine and N-β-hydroxyethyl-N-β'-aminoethylaniline. The nylon fabric is dyed to give a red shade of very good fastness to washing.

EXAMPLE 4

A printing paste is made up by mixing together 10 parts of a 7.5% aqueous dispersion of the dyestuff obtained by reacting 4-amino-2'-hydroxy-5'-methylazobenzene with one molecular proportion of 2-β-hydroxyethylamino-4:6-dichloro-1:3:5-triazine, 41 parts of cold water, 2 parts of an aqueous emulsion of sulphonated sperm oil and pine oil, 1 part of the sodium salt of m-nitrobenzene sulphonic acid, 5 parts of 50% aqueous ethanol, 40 parts of a 5% aqueous solution of sodium alginate and 1 part of sodium bicarbonate.

This printing paste is applied to cellulose acetate fabric from a roller. The fabric is dried and then steamed for 30 minutes. It is then rinsed in water at 25° C., agitated at 50° C. in a 0.2% aqueous solution of soap then rinsed in water and dried. The fabric is printed in a yellow shade having good fastness to washing.

EXAMPLE 5

A printing paste is made up by mixing together 10 parts of a 7.5% aqueous paste of the dyestuff obtained by coupling diazotised 3-chloro-4-aminophenyl ethyl sulphone with the product obtained by interaction of equimolecular amounts of 2-β-hydroxyethylamino-4:6-dichloro-1:3:5-triazine and N-β-hydroxyethyl-N-β'-aminoethylaniline, 32 parts of cold water, 2 parts of an aqueous emulsion of sulphonated sperm oil and pine oil, 1 part of the sodium salt of m-nitrobenzene sulphonic acid, 5 parts of 50% aqueous ethanol and 50 parts of Nafka Crystal Gum.

This printing paste is applied to nylon fabric from a roller. The fabric is then dried and steamed for 30 minutes. It is then rinsed in water at 25° C., agitated at 60° C. in a 0.2% aqueous solution of soap then rinsed in water and dried. The fabric is printed an orange shade having good fastness to washing.

EXAMPLE 6

A printing paste is made up from 10 parts of a 10% aqueous dispersion of the dyestuff used in Example 5, 39 parts of cold water, 40 parts of a 5% solution of sodium alginate, 6 parts of an aqueous emulsion of sulphonated sperm oil and pine oil, 2 parts of the sodium salt of m-nitrobenzene sulphonic acid, 2 parts of p-phenylphenol and 1 part of sodium bicarbonate. This printing paste is applied to cellulose triacetate fabric from a roller. The fabric is dried and then steamed for 30 minutes in a Cottage Steamer using steam at a pressure 10 lbs. above the atmospheric pressure. It is then rinsed in water at 25° C. and agitated for 5 minutes in a boiling aqueous soap solution, again rinsed in water and dried.

The cellulose triacetate fabric is printed in an orange shade having good fastness to washing.

EXAMPLE 7

A printing paste is made by mixing together 57 parts of water, 30 parts of a 5% aqueous solution of sodium alginate, 2 parts of an aqueous emulsion of sulphonated sperm oil and pine oil, 1 part of sodium m-nitrobenzenesulphonate and 10 parts of a 10% aqueous dispersion of the dyestuff obtained by coupling diazotised 3-chloro-4-aminophenyl ethyl sulphone with the product obtained by interaction of equimolecular amounts of 2:4-dichloro-6 - methoxy - 1:3:5-triazine and N-β-hydroxyethyl-N-β'-amino-ethylaniline.

This printing paste is applied to silk fabric by screen printing. The fabric is dried and then steamed for 30 minutes. It is then rinsed in water at a temperature of 25° C., agitated in a 0.2% aqueous solution of soap at 60° C., again rinsed in water and dried. The fabric is printed an orange shade having good wash fastness.

EXAMPLE 8

1 part of 2-hydroxy-5-methyl-4'-[4-chloro-6-di(β-hydroxyethyl)-amino-1:3:5-triazin-2-yl]aminoazobenzene is dispersed in 20 parts of water and the dispersion is added to 4,000 parts of water containing 4 parts of the condensate of ethylene oxide with a fatty alcohol. 100 parts of secondary acetate rayon fabric are added and the dyebath thus obtained is heated to 85° C. and maintained at this temperature for 60 minutes. The fabric is then treated with a hot aqueous solution containing 0.1% of soap and 0.1% of sodium carbonate, and it is then rinsed and dried. The acetate fabric is dyed to a yellow shade of good fastness to washing.

EXAMPLE 9

The dyestuff used in Example 8 is replaced by an equal weight of 4-[4-chloro-6-di(β-hydroxyethyl)amino-1:3:5 - triazin - 2 - yl] aminobenzeneazo-1'-naphth-2'-ol. The acetate fabric is dyed to a red shade of good fastness to washing.

EXAMPLE 10

1 part of 2-chloro-4-ethylsulphonyl-4'-[N-β-(4:6-dichloro - 1:3:5-triazin-2-yl)aminoethyl-N-β'-hydroxyethyl] aminoazobenzene is dispersed in 20 parts of water and the dispersion is added to 4000 parts of water containing 4 parts of the condensate of ethylene oxide with a fatty alcohol. 100 parts of natural silk fibre are added and the dyebath thus obtained is heated to 95° C. and maintained at this temperature for 60 minutes. The fabric is then treated with a hot aqueous solution containing 0.1% of soap and 0.1% of sodium carbonate and it is then rinsed and dried. The silk fibre is dyed to an orange shade of good fastness to washing.

EXAMPLE 11

The dyestuff used in Example 10 is replaced by an equal weight of 2-chloro-4-ethylsulphonyl-4'[N - β - (4-chloro-6-β-hydroxyethylamino - 1:3:5-triazin-2-yl)amino-N-β'-hydroxyethyl] aminoazobenzene. The silk is dyed to an orange shade of good fastness to washing.

The dyestuffs listed in the table below, when applied by the method described in Example 1, give dyeings of the shades shown. The dyeings have good fastness to washing on nylon.

Table

| Example | Dyestuff | Shade on Nylon |
|---|---|---|
| 12 | 2-chloro-4-ethylsulphonyl-4'-diethylamino-2'-(4:6-dichloro-1:3:5-triazin-2-yl) aminoazobenzene. | Bluish-pink. |
| 13 | 2:4-dimethylsulphonyl-4'-diethylamino-2'-(4:6-dichloro-1:3:5-triazin-2-yl)aminoazobenzene. | Reddish-violet. |
| 14 | 2-hydroxy-5-methyl-4'-(4:6-dichloro-1:3:5-triazin-2-yl)aminoazobenzene. | Yellow. |
| 15 | 2-chloro-4-nitro-4'-[N-β-(4:6-dichloro-1:3:5-triazin-2-yl)amino-ethyl-N-β'-hydroxyethyl]-aminoazobenzene. | Dark red. |
| 16 | 4-(4:6-dichloro-1:3:5-triazin-2-yl)-aminonaphth-1-ylazobenzene. | Reddish-yellow. |
| 17 | 2'-phenyl-4'-methyl-4-(4:6-dichloro-1:3:5-triazin-2-yl)aminobenzeneazo-4'-pyrazol-3'-one. | Orange. |
| 18 | 4-acetoacetamido-4'-(4:6-dichloro-1:3:5-triazin-2-yl)aminoazobenzene | Yellow. |
| 19 | 4-di-(β-hydroxyethly)amino-2'-methoxy-4'-(4:6-dichloro-1:3:5-triazin-yl)-aminoazobenzene. | Orange. |
| 20 | 4-hydroxy-4'-(4:6-dichloro-1:3:5-triazin-yl)aminoazobenzene. | Yellow. |
| 21 | 4-nitro-4'-diethylamino-2'-(4:6-dichloro-1:3:5-triazin-2-yl)aminoazobenzene. | Rubine. |
| 22 | 4-(4:6-dichloro-1:3:5-triazin-2-yl)-aminobenzeneazo-1' naphth-2'-ol. | Red. |
| 23 | 4-(4:6-dichloro-1:3:5-triazin-2-yl)-aminoazobenzene. | Yellow. |
| 24 | 2-hydroxy-5-methyl-4'-[4-chloro-6-di-(β-hydroxyethyl)amino-1:3:5-triazin-2-yl]aminoazobenzene. | Do. |
| 25 | 2-hydroxy-5-methyl-4'-(4-chloro-6-phenoxy-1:3:5-triazin-2-yl)amino-azobenzene. | Do. |
| 26 | 4-(4-chloro-6-β-hydroxyethlamino-1:3:5-triazin-2-yl)aminobenzeneazo-1'-naphth-2'-ol. | Red. |
| 27 | 4-[4-chloro-6-di(β-hydroxyethyl) amino-1:3:5-triazin-2-yl]aminobenzeneazo-1'-naphth-2'-ol. | Do. |
| 28 | 2-hydroxy-5-methyl-4'-[4-bromo-6-di-(β-hydroxyethyl)amino-1:3:5-triazin-2-yl]aminoazobenzene. | Yellow. |
| 29 | 1-p-[4-chloro-6-di-(β-hydroxyethyl-amino-1:3:5-triazin-2-yl]aminoanilino-anthraquinone. | Blue. |
| 30 | 2:4-dinitro-4'-(4-chloro-6-phenoxy-1:3:5-triazin-2-yl)aminodiphenylamine. | Orange. |
| 31 | 2:4-dinitro-3'-(4:6-dichloro-1:3:5-triazin-2-yl)aminodiphenylamine. | Yellow. |
| 32 | 2-nitro-4-trifluoromethyl-4'-(4:6-dichloro-1:3:5-triazin-2-yl)amino-diphenylamine. | Orange. |
| 33 | 2:4-dinitro-4'-[4-chloro-6-β-(β'-hydroxyethoxy)ethylamino-1:3:5-triazin-2-yl]aminodiphenylamine. | Do. |
| 34 | 2-nitro-4-(4-chloro-6-phenoxy-1:3:5-triazin-2-yl)aminomorpholinobenzene. | Do. |

EXAMPLE 35

2 parts of 2-nitro-4-(4-chloro-6-methoxy-1:3:5-triazin-2-yl)aminoaniline are dispersed in 4000 parts of water. 100 parts of nylon fabric are added and the dyebath thus obtained is heated at 95° C. for 60 minutes. The resulting yellowish-orange dyeing is added to a solution of 12 parts of sodium nitrite and 36 parts of 36% aqueous hydrochloric acid in 4000 parts of water at a temperature between 15° C. and 20° C. After 30 minutes the dyeing is rinsed and immersed for 10 minutes in a solution at 20° C. of 5 parts of the sodium salt of 2-hydroxy-3-naphthoic acid in 5000 parts of water which has been brought to pH 4.5 by the addition of acetic acid. The solution is then heated at 60° C. for 30 minutes. The resulting reddish-blue dyeing is rinsed in water and then treated with a hot aqueous solution containing 0.1% of soap and 0.1% of sodium carbonate, and then rinsed and dried.

The 2-nitro-4-(4-chloro-6-methoxy-1:3:5-triazin-2-yl)-aminoaniline used in the foregoing example is obtained as follows:

A mixture of 15.3 parts of 2-nitro-1:4-phenylenediamine, 18 parts of 2:4-dichloro-6-methoxy-1:3:5-triazine, 8.4 parts of sodium bicarbonate and 130 parts of acetone is stirred at 50° C. for 60 minutes and then cooled to 10° C. 300 parts of water are added to the mixture and the 2 - nitro-4-(4-chloro-6-methoxy - 1:3:5-triazin-2-yl)-aminoaniline is collected on a filter, washed with water, and dried.

What we claim is:

1. Process for the coloration of artificial fibers, selected from the class consisting of polyamides, polyurethanes, polyacrylonitriles, and polyvinyl alcohol fibers which comprises applying thereto an aqueous suspension of a water-insoluble dyestuff consisting essentially of a dyestuff chromophoric group selected from the class consisting of nitro, azo, and anthraquinone dyestuff series, and containing a halogeno-1:3:5-triazin-2-ylamino group having from 1 to 2 halogen atoms attached to the triazine ring.

2. Process as claimed in claim 1 characterised in that the colouring matter used in the process contains a member selected from the group consisting of 4:6-dichloro-1:3:5 - triazin - 2 - ylamino, 4-chloro-6-$\beta$-hydroxyethyl-amino-1:3:5-triazin-2-ylamino, 4-chloro-6-di($\beta$-hydroxyethyl)amino - 1:3:5 - triazin-2-ylamino, and 4-chloro-6-phenoxy-1:3:5-triazin-2-ylamino group.

3. Process as claimed in claim 2 characterised in that the colouring matter contains an azo group.

4. Process as claimed in claim 1 wherein the artificial fibre is a polyamide.

5. A synthetic textile material selected from the group consisting of polyamides, polyurethane, polyacrylonitrile, and polyvinyl alcohol textile materials colored with a water-insoluble coloring matter containing a halogeno-1:3:5-triazin-2-ylamino group having from 1 to 2 halogeno groups attached to the triazine ring.

6. A polyamide synthetic textile material colored with a water-insoluble coloring matter containing a halogeno-1:3:5-triazin-2-ylamino group having from 1 to 2 halogeno groups attached to the triazine ring.

References Cited in the file of this patent

UNITED STATES PATENTS

| | | |
|---|---|---|
| 1,847,451 | Gyr | July 12, 1932 |
| 2,258,977 | Dickey | Oct. 14, 1941 |
| 2,679,499 | Long | May 25, 1954 |
| 2,773,871 | Brassel | Dec. 11, 1956 |

FOREIGN PATENTS

Dorman: Amer. Dyest. Rep., July 5, 1954, p. 437.
Teintex, B.F. 1,123,375, May 15, 1957, page 405.